Dec. 21, 1943.    G. W. JOHNSON    2,337,201

POULTRY PLUCKING MACHINE

Filed Dec. 26, 1941

INVENTOR,
Gordon W. Johnson.

BY Roy E. Hamilton,
ATTORNEY.

Patented Dec. 21, 1943

2,337,201

UNITED STATES PATENT OFFICE 2,337,201

POULTRY PLUCKING MACHINE

Gordon W. Johnson, Overland Park, Kans.

Application December 26, 1941, Serial No. 424,505

8 Claims. (Cl. 17—11.1)

This invention relates to improvements in poultry plucking machines and has particular reference to the rotary rubbing type.

The principal object of the present invention is a provision of a poultry plucking machine having radially disposed novelly formed resilient fingers operable as a unit to move against the fowl carcass whereby the feathers are removed therefrom.

Another object of the invention is the provision of a poultry plucking machine having a plurality of radially disposed resilient fingers adapted to be moved as a unit, each finger having a normally planar operating face interrupted by a series of spaced apart grooves.

A further object is the provision of a poultry plucking machine having carcass contacting resilient fingers provided with transverse, undulated grooves in their forward contacting surfaces.

Another object of the invention is the provision of a poultry plucking machine having resilient feather engaging fingers provided with transverse grooves of varying depths on their respective operating faces.

Other objects are simplicity and durability of construction, ease and efficiency of operation, and adaptability for use in the plucking of the various kinds of poultry without any objectionable abraiding or scuffing of the meat or skin of the fowl.

With these, as well as other objects which will appear during the course of the specification, in view, reference will now be had to the drawing, wherein.

Figure 1:
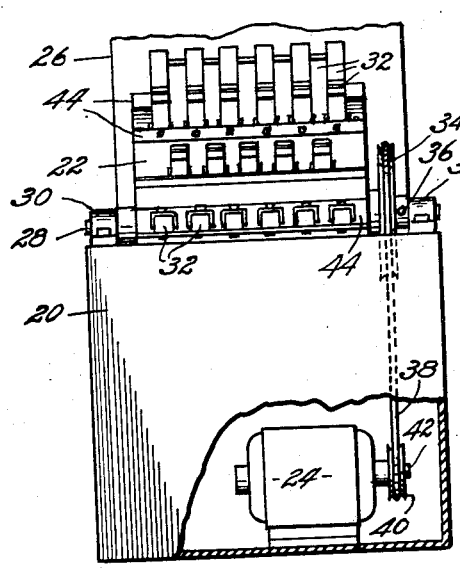
Figure 1 is a front elevation, partially broken away, of a poultry plucking machine embodying this invention.
Figure 2:
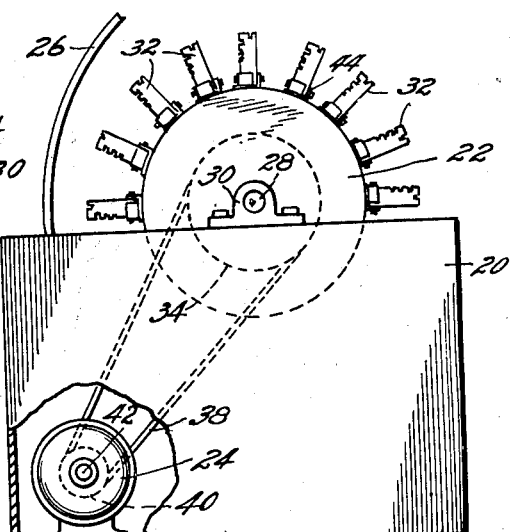
Figure 2 is a side elevation, partially broken away, of the poultry plucking machine shown in Fig. 1.

Throughout the various figures like reference characters refer to similar parts, and the numeral 20 designates a frame or housing made of any suitable material and formed to properly support the rotatably mounted drum 22 and the driving unit 24, so as to maintain them in fixed operative relation.

The housing is provided with a suitable guard 26. The drum 22 is secured to the axially disposed shaft 28 mounted in bearings 30 which in turn are mounted on frame 20. Shaft 28 is shown in a horizontal position; however, it is contemplated to position it in an inclined or vertical position under certain conditions of picking.

The drum 22 is provided with rows of spaced apart resilient fingers 32. As shown in Fig. 1, the adjacent rows of fingers are disposed in staggered relation so as to insure a contact of all the surfaces of the fowl being picked as the drum is rotated.

It will be noted that the sheave wheel 34 is rigidly attached to shaft 28 by means of pin 36 and that this sheave wheel is operatively connected by means of belt 38 to the grooved pulley 40 mounted on the motor shaft 42. Since the speed of travel of the fingers 32 needs to be varied for the picking of the various fowls, it is found convenient to use an adjustable speed electric motor as a power unit.

The fingers 32, because of the constant distortion during the picking operation, necessarily must be made of a tough, resilient material which will withstand hard usage; and it has been found that pure gum rubber is well suited for this purpose.

For mounting the fingers 32 on the drum 20, angled members 44 are secured to the outer periphery of the drum in spaced apart relation parallel with the axis of the drum. A hole 46 extending through the base of the finger is adapted to receive a bolt 48 which in turn passes through a hole 50 formed through the upstanding leg of the angle iron against which the nut 52 rests. U-shaped washer 54 carried by bolt 48 contacts three sides of the finger 32 whereby it can be properly urged against the upstanding leg of the angle iron 44 without undue distortion.

While this method of connecting the fingers to the drum has been found very satisfactory, it is quite apparent that many other means might be used without departing from the spirit of the invention.

Figures 4, 5, 6, 7, 8, 9:
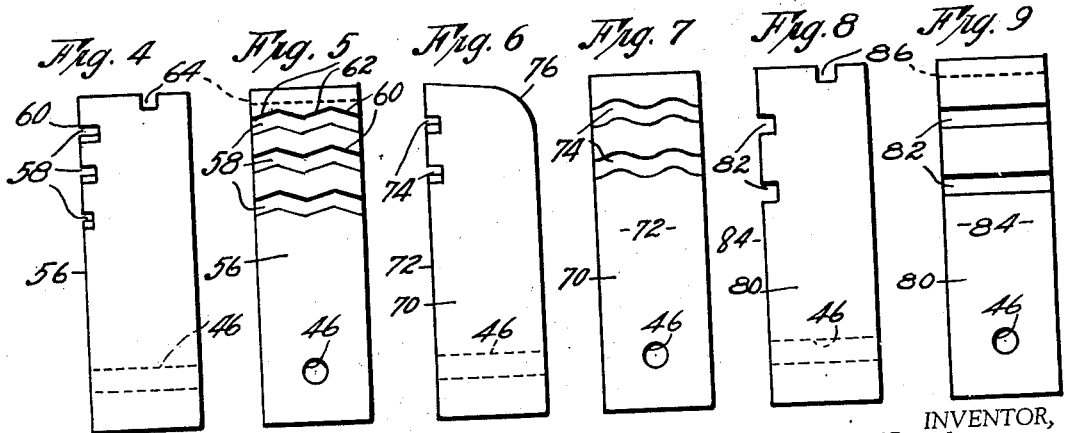
Figure 4 is an enlarged side elevation of one of the resilient fingers detached from the drum.
Figure 5 is a front face view of the finger shown in Fig. 4.
Figure 6 is a modified form of the finger wherein the grooves are curved and the end groove is omitted.
Figure 7 is a front face view of the finger as shown in Fig. 6.
Figure 8 is another modified form of the finger wherein the grooves on the front faces thereof are rectilinear.
Figure 9 is a front face view of the finger shown in Fig. 8.

Referring now specifically to the structure of the finger which constitutes the principal part of this invention, it will be noted that the working face 56 of the finger is substantially planar in form when in the normal position. This planar face is interrupted adjacent its outer portion by a series of transverse spaced apart grooves 58. These grooves are undulated as shown in Fig. 5 and increase in depth as they near the outer extremity of the finger.

In the operation of the machine the fingers are so positioned that their direction of travel is parallel with the longer axis of the finger. For this reason the undulated edges 60 and 62 will be disposed obliquely to the direction of travel, thereby producing an angled wiping effect or a carrier-like action against the carcass whereby the feathers are more effectively contacted for removal.

It will be noted that the grooves 58 are sufficiently wide to insure the exposure of the contact edges 60 and 62 regardless of the position of the finger.

The outer end of the finger 32 is provided with a transverse groove 64 which facilitates a better flexing of the outer forward end of the finger and also serves to present edges which function to remove feathers when the finger is in certain positions.

Figure 3:
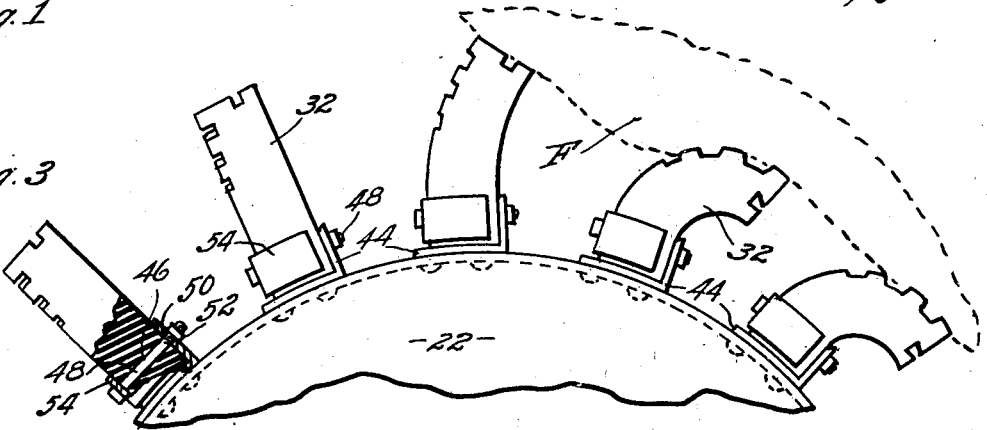
Figure 3 is an enlarged fragmentary view of a portion of the drum with certain of the fingers shown in the distorted operating position.

In the operation of the poultry plucking machine, the operator holds the carcass F against the fingers 32 so that they are distorted as shown in Fig. 3 to follow the contour thereof. By properly rotating or moving the carcass, substantially all parts thereof will be contacted by the rapidly moving fingers and the feathers will be rubbed or pulled therefrom. As the fingers leave the carcass they will flip to the normal position, thus clearing them of the clinging feathers. The amount of pressure necessary to be exerted will vary, depending upon the type of bird being picked and also upon the previous scalding treatment. When using this machine, it has been found convenient to immerse the fowl in water of about 126° to 128° F.

The modified form of the finger shown in Figs. 6 and 7 provides a body member 70 having a front or working face 72 provided with transverse grooves 74 curved and undulated as shown in Fig. 7. The outer extremity of the finger recedes rearwardly from the front edge 72 and is rounded at 76.

In Figs. 8 and 9, which show a further modified form of the fingers, there is provided a body member 80 having rectilinear transverse grooves 82 in the forward face 84 thereof, and a groove 86 at the outer end of the finger. These grooves are substantially rectangular in cross sectional view and are disposed substantially parallel with the drum shaft 28.

Figures 10, 11:
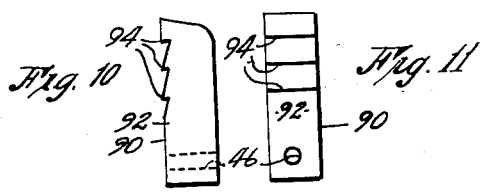
Figure 10 is a further modification of the finger shown in a reduced size.
Figure 11 is a face view of the finger shown in Fig. 10.

The modified form shown in Figs. 10 and 11 consists of a body member 90 with a forward operating face 92 having the outer portion thereof formed to present inwardly projecting ratchet teeth 94. These ratchet teeth are of greater depth as they proceed outwardly toward the end of the finger. In each of the modified forms of fingers is provided a hole 46 to facilitate the anchoring of the fingers to the drum.

Particular attention is called to the specific type of fingers used and especially the undulated grooves which present edges which obliquely contact the feathers. It will be noted that the undulations are substantially symmetrical on each half of the working face, thereby permitting an oblique travel of the operating edges 60 and 62 against the carcass without unbalancing and twisting the finger laterally. This specific structure of the finger also makes it possible to utilize the transverse expansion and contraction of the gum rubber finger, as well as the rearward flexing of the finger.

While I have shown specific embodiments of my invention, it is quite apparent that minor changes might be made without materially affecting the operation of the machine and without departing from the scope and spirit of the invention as set forth in the appended claims.

What is claimed as new and desired to be protected by Letters Patent is:

1. In a poultry plucking machine having a rotatably mounted drum member, a plurality of resilient fingers which extend outwardly from said drum member, individual fingers having a substantially planar forward operating face interrupted by a plurality of transverse undulated grooves whereby undulated operating edges are formed thereacross.

2. In a poultry plucking machine of the character described, resilient plucking fingers each having a substantially planar forward face interrupted by a series of transverse grooves, successive grooves increasing in depth as they near the free end of the finger.

3. In a poultry plucking machine of the rotary drum type, a series of spaced apart resilient feather plucking fingers, each finger having a forward operating face transversely grooved to produce zig-zag feather engaging edges.

4. A feather engaging finger for poultry plucking machines comprising a resilient body having a substantially flat front face interrupted by a transversely undulated groove whereby is formed a zig-zag feather engaging edge.

5. A feather engaging finger for poultry plucking machines comprising a resilient body having a flat front face interrupted by a plurality of transversely undulated grooves whereby is formed undulated feather engaging edges.

6. A resilient picking element for a machine of the kind described, formed to provide at least one substantially straight face, said face being provided with a plurality of spaced projections, said projections each having a plurality of angularly disposed sides presenting at least one irregular carrier-like edge.

7. A feather engaging finger for poultry plucking machines comprising a resilient rectilinear body member having a forward operating face grooved to present feather engaging edges disposed in angled relation to a plane perpendicular to the major axis of said body member.

8. In a poultry plucking machine of the rotary type, a plurality of spaced apart resilient feather engaging fingers mounted on a rotor and extending radially therefrom, certain of said fingers having a substantially planar forward face interrupted by an angular transverse groove, whereby is formed a feather engaging edge disposed in angled relation to the axis of rotation of said rotor.

GORDON W. JOHNSON.